United States Patent
Liu et al.

(10) Patent No.: US 10,338,560 B2
(45) Date of Patent: Jul. 2, 2019

(54) TWO-WAY ARCHITECTURE WITH REDUNDANT CCDL'S

(71) Applicants: SAFRAN ELECTRONICS & DEFENSE, Boulogne-Billancourt (FR); SAFRAN HELICOPTER ENGINES, Bordes (FR)

(72) Inventors: Celine Liu, Boulogne-Billancourt (FR); Nicolas Marti, Boulogne-Billancourt (FR); Stephen Langford, Pau (FR)

(73) Assignees: SAFRAN ELECTRONICS & DEFENSE, Boulogne-Billancourt (FR); SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 15/508,476

(22) PCT Filed: Sep. 4, 2015

(86) PCT No.: PCT/FR2015/052342
§ 371 (c)(1),
(2) Date: Mar. 2, 2017

(87) PCT Pub. No.: WO2016/034824
PCT Pub. Date: Mar. 10, 2016

(65) Prior Publication Data
US 2017/0277152 A1    Sep. 28, 2017

(30) Foreign Application Priority Data

Sep. 5, 2014 (FR) .................................. 14 58350

(51) Int. Cl.
| G06F 7/70 | (2006.01) |
|---|---|
| G06F 19/00 | (2018.01) |
| G06G 7/00 | (2006.01) |
| G06G 7/76 | (2006.01) |
| G05B 19/048 | (2006.01) |

(Continued)

(52) U.S. Cl.
CPC ........... *G05B 19/048* (2013.01); *B64D 31/00* (2013.01); *G05B 9/03* (2013.01); *G06F 11/2007* (2013.01);
(Continued)

(58) Field of Classification Search
CPC ........ G05B 19/048; G05B 11/01; G05B 9/03; B64D 31/00; H04L 12/56
(Continued)

(56) References Cited

U.S. PATENT DOCUMENTS

| 2004/0088991 A1 | 5/2004 | Gallant et al. |
| 2004/0153700 A1 | 8/2004 | Nixon et al. |

(Continued)

OTHER PUBLICATIONS

International Search Report and Written Opinion in PCT/FR2015/052342 dated Dec. 3, 2015, with English translation.
(Continued)

*Primary Examiner* — Mahmoud S Ismail
(74) *Attorney, Agent, or Firm* — Womble Bond Dickinson (US) LLP

(57) ABSTRACT

A flight control system of an aircraft including a first processing unit, a second processing unit, communication means configured to establish a first two-way digital link and as second two-way digital link between the first processing unit and the second processing unit. The second link is redundant with the first link, and the first link and second link are likely to be active concomitantly. The system further includes backup communication means enabling data exchanges between the first processing unit and the second processing unit in the case of a failure in the first link and second link. The backup communication means includes an array of sensors or actuators and/or a secure onboard network for the avionics.

6 Claims, 4 Drawing Sheets

(51) Int. Cl.
*G05B 9/03* (2006.01)
*G06F 11/20* (2006.01)
*H04L 12/40* (2006.01)
*B64D 31/00* (2006.01)
*H04L 12/28* (2006.01)
*H04L 12/56* (2006.01)
*G05B 11/01* (2006.01)
*G05B 9/02* (2006.01)

(52) U.S. Cl.
CPC ............. *H04L 12/40182* (2013.01); *G05B 2219/24182* (2013.01); *G05B 2219/25144* (2013.01); *G05B 2219/25163* (2013.01); *G05B 2219/25174* (2013.01)

(58) Field of Classification Search
USPC .................... 701/14; 370/401; 700/17, 82
See application file for complete search history.

(56) References Cited

U.S. PATENT DOCUMENTS

| | | | |
|---|---|---|---|
| 2006/0130134 A1* | 6/2006 | Colas | H04L 63/0227 726/11 |
| 2006/0184253 A1* | 8/2006 | Andrews | G01C 23/00 700/17 |
| 2008/0205416 A1* | 8/2008 | DeChiara | H04L 12/40013 370/401 |
| 2010/0222900 A1* | 9/2010 | Kakino | G05B 9/03 700/82 |

OTHER PUBLICATIONS

Search Report and Written Opinion in French Application No. 1458350 dated Jul. 23, 2015, with English translation coversheet.

* cited by examiner

TWO-WAY ARCHITECTURE WITH REDUNDANT CCDL'S

BACKGROUND OF THE INVENTION

Field of the Invention

The object of the invention is a flight control system for an aircraft comprising two processing units or computers and forming a two-way architecture.

This system most particularly applies to engines with reduced dimensions such as helicopter engines.

Description of Related Art

On-board flight control systems equipping aircraft such as existing airplanes or helicopters execute functions for controlling and regulating the engine of the aircraft insuring proper operation of the latter. Such functions are critical for the safety of passengers. Such systems therefore have to be fail-safe systems.

For this, the existing flight control systems generally comprise two of processing units or computers, each capable of ensuring proper operation of the engine. Such a system thus forms a two-way architecture wherein each channel is capable of ensuring the execution of said critical functions in the case of a failure of the other channel.

In order to determine whether it should assume the execution of these functions, each processing unit should be able to exchange information with the other processing unit of the control system, notably information relating to the health condition of this other processing unit. To do this, both processing units are generally connected through a bidirectional digital link or two unidirectional links on opposite directions, such as a CCDL ("Cross Channel Data Link") link.

In order to reinforce the fail-safe nature of such a flight control system, the processing units of the control system may be disassociated into two remote casings in order to be separated geographically from each other and to thereby reduce their sensitivity to external aggressions. Further, in order to make the control system resistant to a data link failure between the processing units, the processing units may be connected through an additional link in the form of several discrete analog links, which may attain ten in number on civil fadecs. Nevertheless, the increase in the number of links increases the probability that one of them is faulty and increases the wiring volume, are making it difficult to develop a compact flight control system. Although this is accessory for controlling engines of large aircraft such as airliners, such compactness becomes primordial for containing the total size in the case of the engine of a small aircraft, such as a helicopter engine.

Therefore there exists a need for a control system having a two-way architecture minimizing the amount of wiring while being resistant to failures and external aggressions.

BRIEF SUMMARY OF THE INVENTION

The present invention thereby relates, according to a first aspect, to a flight control system of an aircraft comprising:
a first processing unit,
a second processing unit,
communication means configured for establishing a first bidirectional digital link and a second bidirectional digital link between the first processing unit and the second processing unit,
said second link being redundant with the first link,
and said first and second links may be active concomitantly,
said system further comprising backup communication means giving the possibility of ensuring exchanges of data between the first and second processing units in the case of failures of the first and second links,
said backup communication means comprising a network of sensors or actuators and/or an on-board secure network for avionics.

Such a system has a strong resistance to failures by the redundancy of its processing units and of its communication means as well as by the minimization of the number of communication links, while reducing its bulkiness. Further, the backup communication means give the possibility of avoiding complete blindness of the two-way system and a cut-off of the communications between both processing units. Finally, the use of such networks for exchanging pieces of information between the processing units gives the possibility of increasing the redundancy level of the communication means between the processing units and of ensuring the safe operation of the flight control system without however requiring the setting into place of additional communication means exclusively dedicated to communication between the processing units.

According to an advantageous and non-limiting feature, the first and second links may be CCDL ("Cross Channel Data Link") links.

Such a link notably gives the possibility to processing units of exchanging more complex health information than those exchanged via discrete analog links of known systems while limiting the wiring volume.

The on-board secure network for avionics may for example be a redundant Ethernet network of the AFDX ("Avionics Full DupleX switched ethernet") or µAFDX type.

According to an advantageous and non-limiting feature, each processing unit of the control system according to the first aspect comprises means for verifying the integrity of the data received over each of the links.

This gives the possibility of ensuring that the received data have not been corrupted during their transmission.

Moreover, each processing unit may comprise means for verifying, subsequently to the transmission of a datum both over the first link and over the second link, the consistency of the received data over the first link and over the second link.

This gives the possibility of reinforcing the system detection capability of the alterations of the exchanged data between the processing units and thus minimizes the failure probability of the flight control system.

Moreover, the communication means of the flight control system according to the first aspect may be configured for transmitting from a first processing unit to a second processing unit data relative to the health of the first processing unit, said system according to the first aspect further comprising means for selecting a processing unit for controlling an engine of said aircraft from among the first and second processing units according to the transmitted data relative to the health of the first processing unit and to data relative to the health of the second processing unit.

Such an exchange of data allows each processing unit to be aware of the health condition of the other processing unit in order to guarantee that the channel with best health always ensures control of the engine.

BRIEF DESCRIPTION OF THE DRAWINGS

Other features and advantages will become apparent upon reading the description which follows of an embodiment. This description will be given with reference to the appended drawings wherein.

DETAILED DESCRIPTION OF THE INVENTION

Figure 1:
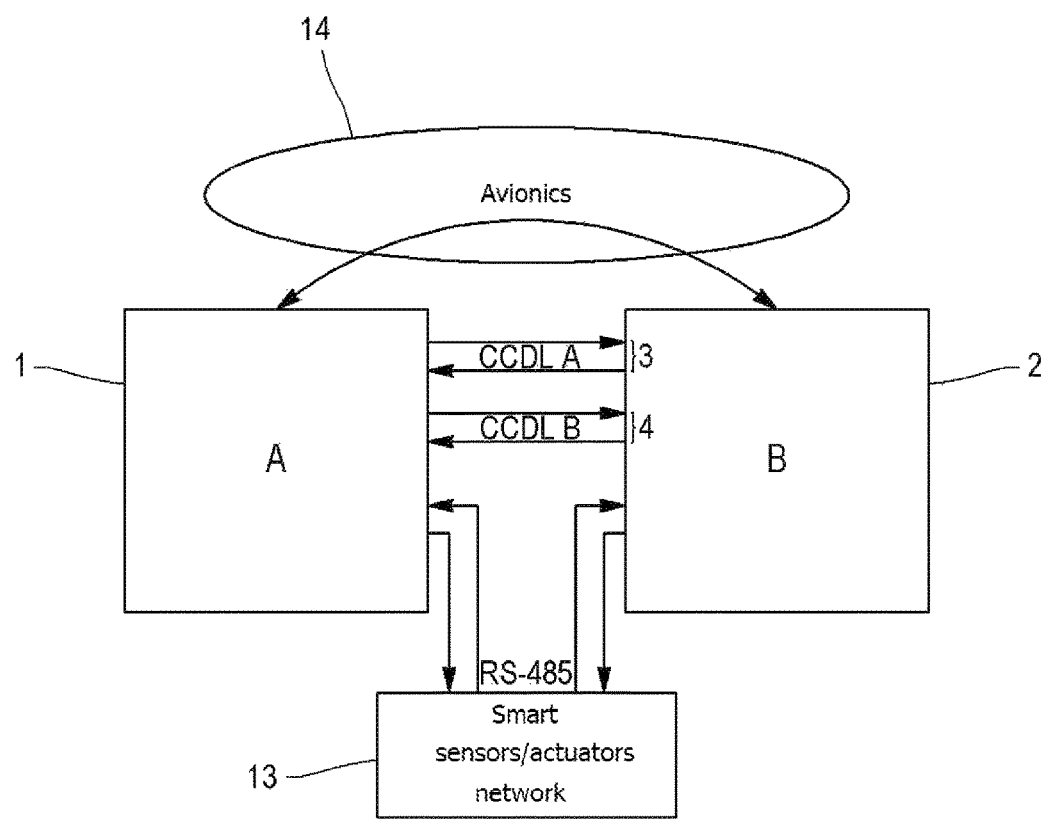
FIG. 1 schematically illustrates a flight control system according to an embodiment of the invention.

An embodiment of the invention, illustrated in FIG. 1, relates to a flying control system of an aircraft comprising at least one first processing unit 1 and a second processing unit 2. Both of these processing units are redundant and may each execute the functions for controlling and regulating the engine of the aircraft. The system as illustrated in FIG. 1, that forms a two-way architecture comprising a channel A and a channel B.

The processing units 1 and 2 may be processors of a same multiprocessor computer system including several processors. In order to reinforce the resistance of the flight control system to external aggressions and to avoid that a single localized event may disrupt both processing units 1 and 2, both channels may be installed at a distance from each other in separate casings. In such a configuration, the processing units are not integrated execution cores within a single processor.

The system also comprises communication means allowing connection of both processing units in order to allow data exchanges essential to the proper operation of each of the processing units such as pieces of information on the health condition of the opposite processing unit.

This two-way system is distinguished from the known systems in that the communication means are configured for establishing a first bidirectional digital link 3 and a second bidirectional digital link 4 between the first processing unit 1 and the second processing unit 2. Unlike known systems, such a system does not include any discrete link between both processing units, which gives the possibility of limiting the complexity of its wiring and the probability that one of the communication links fails.

The second link 4 is redundant with the first link 3 in order to ensure communication between the both processing units in the case of failure of the first link 3. Such redundancy guarantees, of from the point of view of information exchange between both processing units, the same safety level as the one exhibited by known systems.

Further, said first and second links may be active, concomitantly. Thus, unlike known systems in which the redundant link is not generally used in the case of a failure of the first link, the flight control system may use the first link 3 et and the second link 4 at the same time during normal operation, i.e. in the absence of any failure of one of the two links, and may utilize the concomitant use of both of these links for verifying the absence of corruption in the data exchanged between both processing units.

The first and second processing units 1 and 2 may use the protocol Ethernet IEEE 802.3 or HLDC or SDLC or any other protocol having a function for detecting or correcting errors for communicating with each other via both links 3 and 4. An Ethernet link notably gives the possibility of ensuring high performances, great environmental robustness, notably towards lightning resistance and electromagnetic compatibility ("OEM") and a high functional robustness by applying the mechanism of data integrity control and of flow control. Further, the Ethernet protocol is an industrial standard consistent with avionic communication technologies, such as AFDX ("Avionics Full DupleX switched ethernet") or µAFDX, and with maintenance.

The first and second links may be CCDL ("Cross Channel Data Link") links. Such a link allows synchronization of each application with an accuracy of less than hundred microseconds. Such a link also allows, instead of exchanging discrete data like in known systems, exchanging health information built by the hardware or the software, pieces of information useful for the system (acquisition, statuses, . . . ) and functional data of the operating system (OS or "Operating System") or of the application system (AS ou "Application System").

Figure 2:
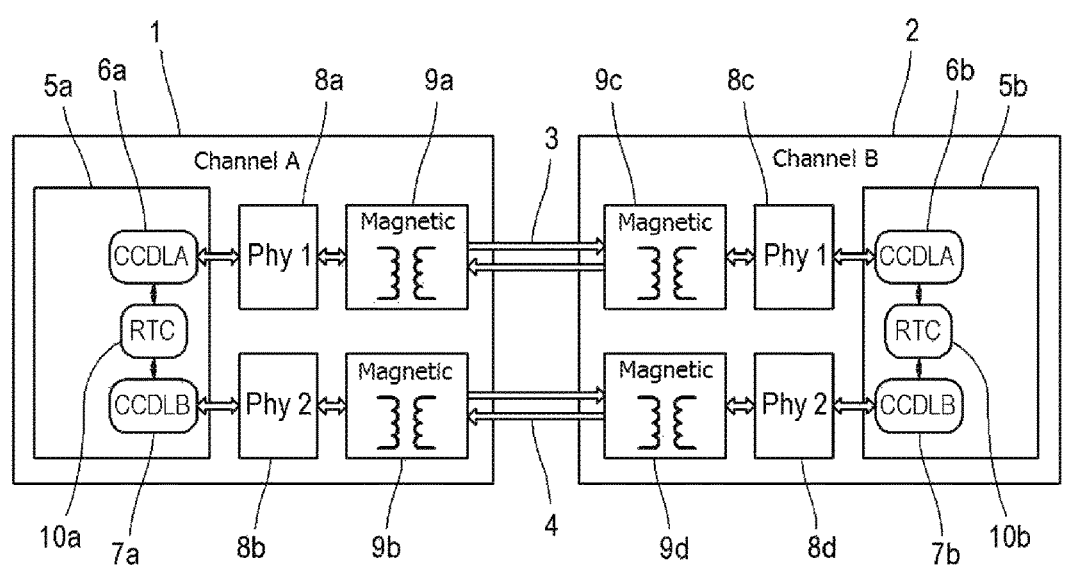
FIG. 2 schematically illustrates hardware means intended to establish two CCDL links between two processing units of a flight control system according to an embodiment of the invention.

Such CCDL links between both processing units A and B are illustrated in FIG. 2. Each processing unit 1, 2 may comprise a system, for example a system on a chip (SoC) or a system consisting of a microprocessor and peripherals implemented in separate casings or in a FPGA card, 5a, 5b including a first CCDL module (CCDLA) 6a, 6b for establishing the first CCDL link 3 and a second CCDL module (CCDLB) 7a, 7b for establishing the second CCDL link 4. As each CCDL link has its own module, independence of each of the CCDL links is reinforced and the simultaneous failure probability of both CCDL links is thereby reduced. Each CCDL module may be connected to the input/output interface of its casing via a hardware interface Phy 8a, 8b, 8c, 8d and a transformer 9a, 9b, 9c, 9d.

Figure 3:
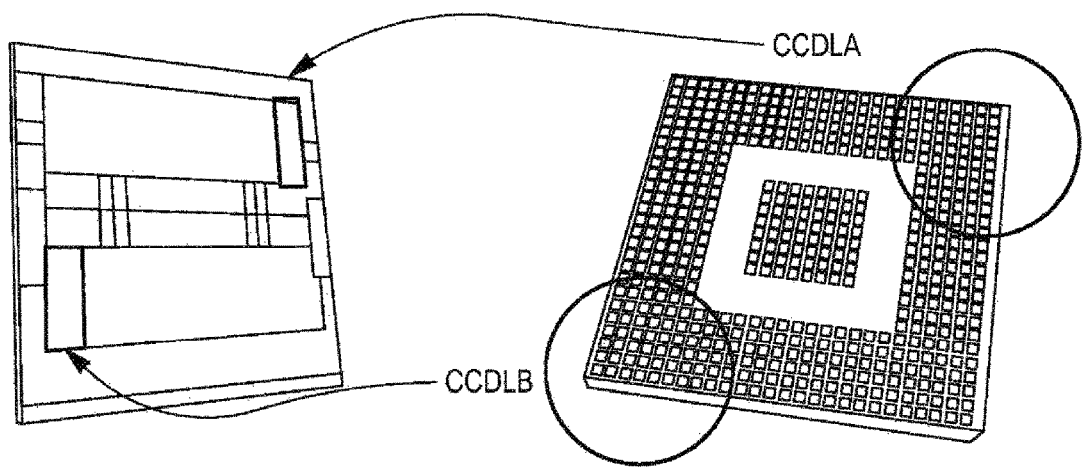
FIG. 3 schematically illustrates the physical segregation of CCDL modules of each processing unit of a flight control system according to an embodiment of the invention.

As illustrated in FIG. 3, the CCDL modules of each processing unit may be physically segregated by being positioned on the system 5a, 5b in distinct localizations far from each other, for example by positioning each of them in a corner of the system. Alternatively, these CCDL modules may be positioned on distinct chips. This allows reduction in the common failure probability in the case of an alteration of the SEU ("Single Event Upset") or MBU ("Multiple Bit Upset") type.

Figure 4:
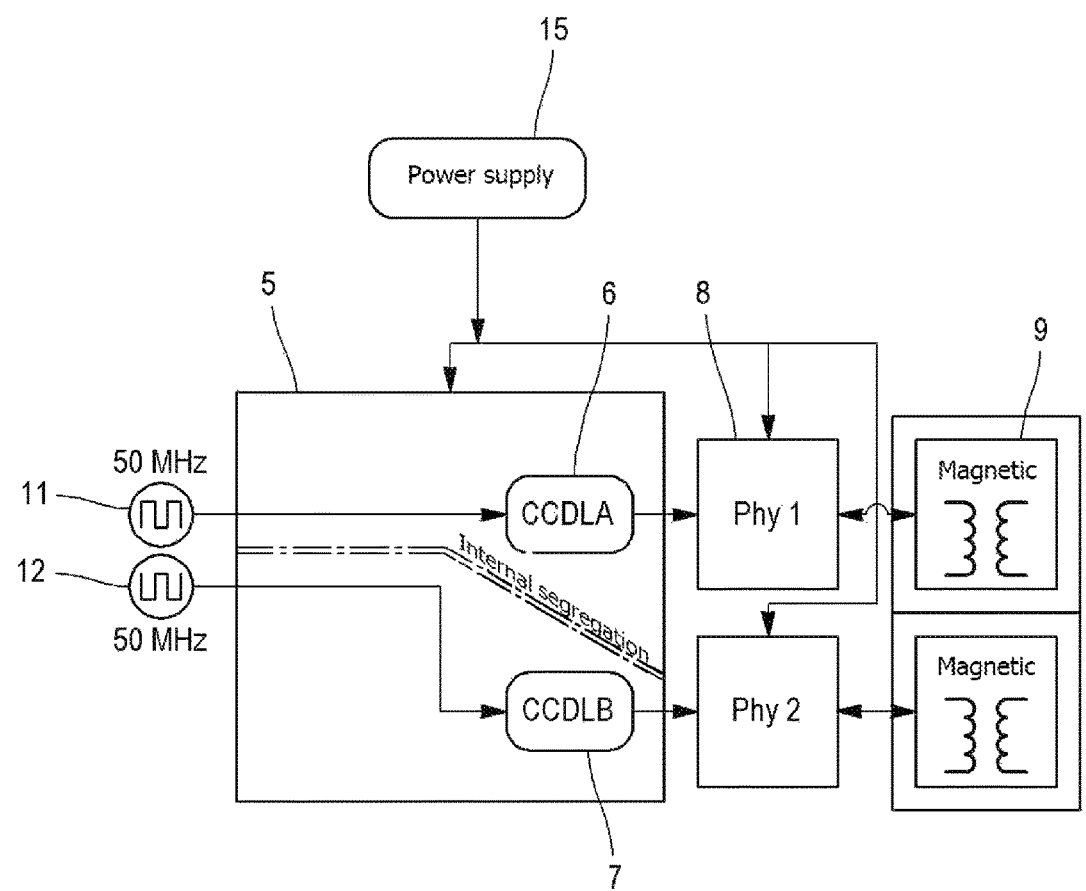
FIG. 4 schematically illustrates the segregation of the hardware means of a processing unit intended for establishing two CCDL links according to an embodiment of the invention.

According to a first alternative, each system 5a, 5b is powered by a separate power supply. According to a second alternative, in addition to a power supply 15 ("power supply") common to the whole of the system on a chip, each system on a chip may be powered with two distinct clock signals 11 and 12, as illustrated in FIG. 4. Thus, although they are not powered independently, the CCDL modules of each processing unit may be powered with independent clocks, which reinforces the fail-safe nature of the system on a chip by preventing a clock failure of one of the CCDL modules from being able to affect the other CCDL module.

The CCDL modules of each processing unit may be synchronized by means of a local real-time clock mechanism (HTR or RTC "Real time clock") 10a, 10b and of a synchronization mechanism such as a synchronization window mechanism. Thus, in the case of synchronization loss, each processing unit may operate by means of its local clock and then be synchronized again upon receiving a valid signal. The local clock mechanism is programmable by the application and its programming is protected against alterations of the SEU ("Single Event Upset") or MBU ("Multiple Bit Upset") type. The CCDL links may nevertheless continue to operate even in the absence of synchronization or in the case of losing a clock.

The system may further comprise backup communication means giving the possibility of ensuring exchanges of data between the first and second processing units and exclusively used in the case of failures of the first and second links, for avoiding the cut-off of the communications between the processing units.

In a first embodiment illustrated in FIG. 1, these backup communication means may comprise a network of sensors or actuators 13. Such a network of sensors or actuators may as an example and be a network of smart sensors or actuators ("smart-sensor", "smart-actuator"). Each processing unit may then be connected to this network 13 via a bus of the RS-485 type allowing transmission of information no longer in an analog way but digitally.

In a second embodiment illustrated in FIG. 1, these backup communication means comprise an on-board secure network for avionics 14. Such an on-board secure network may as an example be a redundant Ethernet network such as AFDX ("Avionics Full DupleX switched ethernet") or μAFDX. Such a network provides means for sharing resources, for segregation of flows as well as determinism and the required availability for aeronautical certifications.

As the digital signals transmitted via both bidirectional links between the processing units are more sensitive to perturbations than the discrete analog signals transmitted over the plurality of discrete links of existing systems, mechanisms for integrity control and for consistency control of data transmitted between both remote processing units may be set into place.

Thus each processing unit may comprise means for verifying the integrity of the data received via each of the bidirectional links. In order to verify the integrity of the received data, the various fields of each received frame may be verified, notably in the case of an Ethernet link, the fields relative to the destination address, to the source address, to the type and to the length of the frame, to the MAC data and to the filling data. A frame may be considered as non-valid if the length of this frame is not consistent with the specified length in the frame length field or if the bytes are not integers. A frame may also be considered as non-valid if the redundancy check (CRC, "Cyclic Redundancy Check") calculated upon receiving the frame does not correspond to the received CRC because of errors due for example to interferences upon transmission.

Further, each processing unit may comprise means for verifying subsequently to the transmission of a datum are both over the first link 3 and over the second link 4, the consistency of the received data over both links which have to convey the same information in the absence of a failure or corruption of the transmitted frames.

In order to be able to ensure the control of an engine of the aircraft, the flight control system has to entrust one of the two channels with the control. For this, each processing unit should be aware of the health condition of the opposite processing unit. To do this, the communication means of the system are configured for transmitting, from a first processing unit to a second processing unit, data relative to the health of the first processing unit and vice versa.

Such health data are data allowing the selection of a channel and the establishing of a full system diagnostic. They may be: CCDL diagnostic data, the signals required for the channel switching logic, the data of statuses of the operating system or applications, hardware diagnostic data, notably of sensors or actuators, functional diagnostic data obtained by the software, . . . .

The flight control system may comprise means for selecting for controlling an engine of the aircraft, according to data relative to the health of the first processing unit and to data relative to the health of the second processing unit, a processing unit from among the first and second processing units are giving the possibility of ensuring better operation of the flight control system.

The invention claimed is:

1. A flight control system of an aircraft comprising:
   a first processing unit,
   a second processing unit,
   communication means configured for establishing a first bidirectional digital link and a second bidirectional digital link between the first processing unit and the second processing unit,
   said second bidirectional digital link being redundant with the first bidirectional digital link,
   wherein said first and second bidirectional digital links may be active concomitantly,
   said flight control system further comprising backup communication means giving the possibility of ensuring exchanges of data between the first and second processing units whenever failures of the first and second bidirectional digital links occur,
   said backup communication means comprising at least one device part including at least one of: a network of sensors, a network of actuators and an on-board secure network for avionics.

2. The flight control system according to claim 1, wherein the first and second bidirectional digital links are CCDL ("Cross Channel Data Link") links.

3. The flight control system according to claim 1, wherein the on-board secure network is a redundant Ethernet network of the AFDX ("Avionics Full DupleX switched ethernet") or μAFDX type.

4. The flight control system according to claim 1, wherein each processing unit comprises means for verifying integrity of the data received over each of the bidirectional digital links.

5. The flight control system according to claim 1, wherein each processing unit comprises means for verifying, subsequently to the transmission of a datum both over the first bidirectional digital link and over the second bidirectional digital link, the consistency of the received data over the first bidirectional digital link and over the second bidirectional digital link.

6. The flight control system of an aircraft according to claim 1, wherein the communication means are configured for transmitting from a first processing unit to a second processing unit data relative to health of the first processing unit, said flight control system comprising means for selecting a processing unit for controlling an engine of said aircraft from among the first and second processing units according to the transmitted data relative to health of the first processing unit and to data relative to health of the second processing unit.

* * * * *